United States Patent Office
3,348,131
Patented Oct. 17, 1967

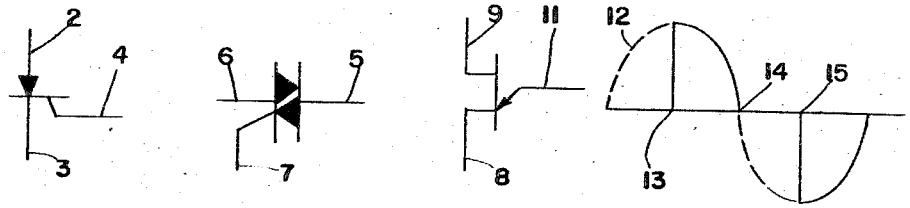
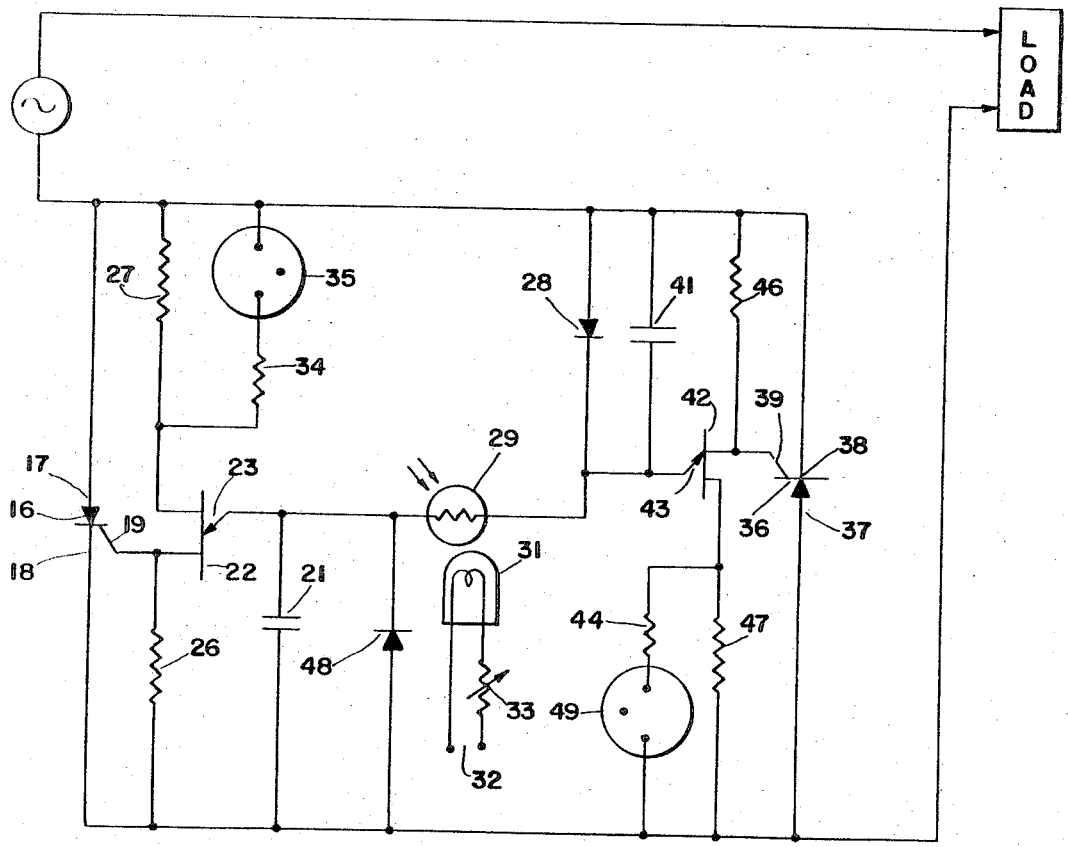
Fig. 1  Fig. 2  Fig. 3  Fig. 4
Fig. 5

3,348,131
A-C POWER CONTROL CIRCUIT HAVING A TRIGGER MEANS WITH A VOLTAGE BREAKDOWN DEVICE CONNECTED TO THE BASE OF A UNIJUNCTION TRANSISTOR
James Randle Banks, Cleveland Heights, Ohio, assignor to Encore Manufacturing Corporation, Cleveland, Ohio, a corporation of Ohio
Filed Aug. 11, 1964, Ser. No. 388,822
12 Claims. (Cl. 323—22)

ABSTRACT OF THE DISCLOSURE

Trigger means initiate conduction in solid state switching means to control power flow between an A-C source and a load. The trigger means is controlled by a capacitor having a variable time constant charging circuit for determinging the time in each A-C half-cycle when the switching means become conducting.

---

This invention relates to a full-wave A-C control circuit for selectively and variably controlling the power into an electrical load such as one or a plurality of incandescent lamps or one or a plurality of resistance heaters.

The switching components of the circuit, or the entire circuit if desired, can fit into a compact, lightweight unit which exhibits small heat generation because of its high electrical efficiency. The simplicity of the circuit plus its quick response and freedom from hunting or oscillating make it excellent and economical for its purpose. Advantages of the unit over other related devices include a lower requirement for periodic maintenance because there are no moving parts or thermal emission apparatus such as tubes, no ferric-core devices such as magnetic amplifiers are required, and the control input can be of very low power. The latter feature enables the control input to be safe, unsusceptible to stray pickup of power from extraneous sources, and versatile—the control input being simply coupled to the switching circuit by light energy, such energy, for example, being conveniently supplied by a small incandescent lamp using low voltage alternating current or direct current of either polarity, the circuit being sensitive and responsive to such control input.

Control circuits of this invention can be combined with other ones of like kind to form an array or battery capable of common or individual operation with remote control if desired and excellent portability. The array can be modular, and individual units can be added to it from time to time as demand and economy dictate. The invention comprehends means for simple adjustment to match the several units in an array in electrical sensitivity characteristics without assessment of the output, for example, by the indication of control setting from self-contained gas-discharge lamps in the several units.

This full-wave A-C control circuit for selectively and variably controlling power into an electrical load comprises broadly a load connection, an A-C voltage source connection, solid state switching means for controlling power from said source connection to said load connection, unijunction transistor relaxation oscillator-trigger means responsive to a light-sensitive variable resistor therein and including linear resistive voltage divider means, said oscillator trigger means initiating electrical conduction in said solid state switching means at a time in the A-C cycle dependent upon the ohmic resistance of said variable resistor, and means for illuminating said variable resistor, said means for illuminating being adjustable in intensity with respect to the light energy being delivered to said variable resistor.

One of the features of the invention is the provision of a voltage breakdown device in the base circuit of the unijunction transistor means effectively to increase the current flow through the interbase resistance of the transistor means when the breakdown device conducts. Thus, the middle of the characteristic curve of the switching circuit is expanded.

The means for illuminating said variable resistor, thus applying control input energy to said resistor, can be, for example, a flame, sunlight, an electric lamp, or, preferably for efficiency and economy, a low voltage incandescent lamp having adjustable light output. Where the light source is fixed in intensity, variation of light therefrom illuminating the variable resistor can be done by shading the light source (e.g., suitably a variable density filter interposed between the light source and the variable resistor) or by adjusting physical proximity of the light source to the variable resistor. To prevent extraneous light from impinging on the variable resistor, thus affecting the system control, the light source and a variable resistor can be conventionally shielded as with opaque material.

The invention will be better understood from the following description of several embodiments, taken in conjunction with the accompanying drawings, in which:

FIGURES 1, 2 and 3 are schematic representations of a silicon controlled rectifier, a triac and a unijunction transistor, respectively, used in practicing the invention;

FIGURE 4 is a voltage waveform useful in understanding the invention; and,

FIGURES 5, 6 and 7 are circuit diagrams of embodiments of the invention.

Figure 6:
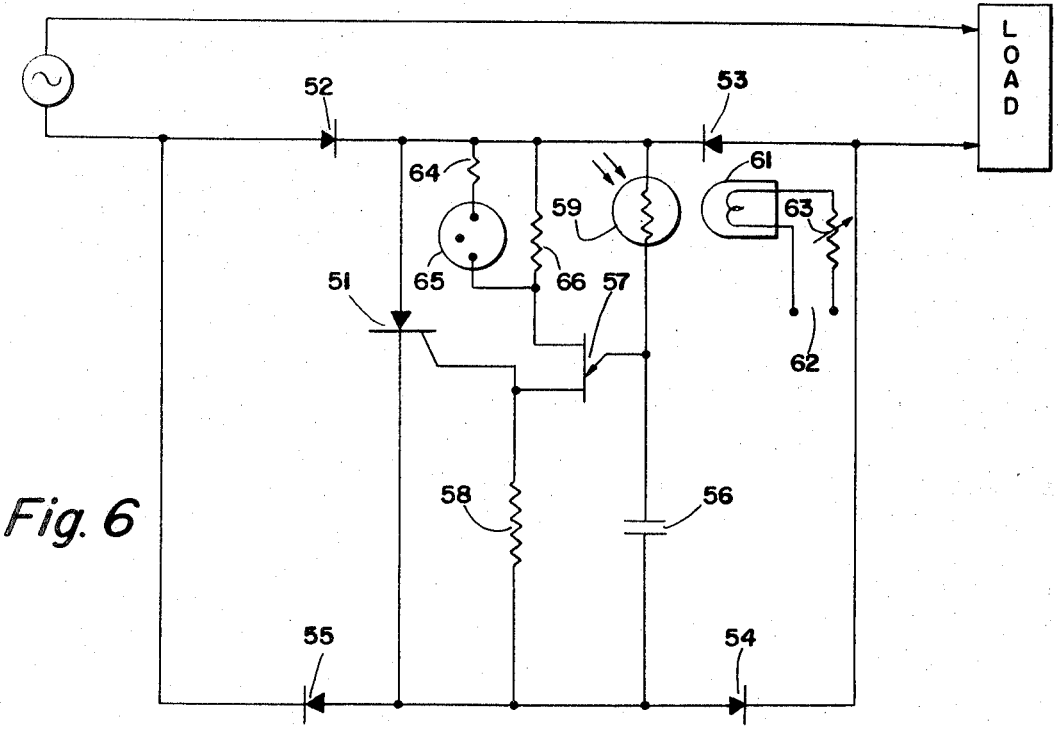

FIGURE 1 schematically represents a silicon controlled rectifier, commonly known in the art as an "SCR," a unilateral solid state switch. An SCR is capable of turning on a large current with application of a small current. It may be rendered conductive by a pulse, remaining in a conducting state until the current through the SCR virtually ceases. The anode is designated 2, the cathode as 3, and the gate as 4. When the anode is positive with respect to the cathode, conduction can be initiated by a pulse which is positive with respect to the cathode. The initiating of conduction is referred to as "firing," caused by a "triggering" pulse.

FIGURE 2 is a schematic representation of a triac, a bilateral solid state switch. A triac is capable of turning on a large current with the application of a small current. Like the SCR, the triac may be rendered cosductive by a small pulse, remaining in a conducting stage until the current flowing through the triac virtually ceases. Terminal $T_1$ is designated 6, terminal $T_2$ is designated 5, and the gate is designated 7. Unlike the SCR, firing of the triac may be brought about when terminal $T_1$ is either positive or negative by a triggering pulse of either polarity.

FIGURE 3 is a schematic representation of a unijunction transistor. The unijunction transistor is a double-base diode exhibiting a voltage breakdown characteristic which makes it suitable for use as a relaxation oscillator. This permits the production of triggering pulses with a small number of associated component parts. Base $B_1$ is designated 8, base $B_2$ is designated 9, and the emitter is designated 11. The unijunction transistor exhibits a constant resistance between bases $B_1$ and $B_2$ known as the interbase resistance. When the base $B_1$ to emitter voltage differential is less than a predetermined fraction of the interbase voltage, the emitter is back-biased and therefore the emitter does not conduct. This predetermined fraction is called the "intrinsic stand-off ratio" or eta; it is that fraction of the interbase voltage which is required to cause the emitter-base $B_1$ junction section of the transistor to conduct, exhibiting a negative resistance. These characteristics make the unijunction transistor suitable for producing triggering pulses.

FIGURE 4 is a schematic representation of the voltage wave forms associated with an A-C phase control switching circuit. Dash line 12 represents the sinusoidal voltage available from the source plotted against time on the horizontal axis. Initially, the switching circuit is open; it closes later in the cycle, as shown at point 13, when a solid state switch is caused to conduct. Conduction continues through the solid state switch until the current through the switch is almost zero, as just above point 14, when such conduction ceases. Conduction is then initiated in a solid state switch in the second half cycle at point 15 in a manner similar to that in the first half cycle.

Each half cycle can be switched with its own SCR, or the switch for both half cycles can be a single SCR or a single triac. The amount of power received by a load is proportional to the square of the area under the sinusoidal voltage wave form. When conduction takes place for less than the full cycle, less than maximum power available is received by the load. By switching on at a given time in each half cycle, and thereby varying the duration of conduction (conduction angle) in each half cycle, from zero to full, the proportion of available power that is received by the load can be varied from zero to full. Preferably, to avoid a so-called "D-C component" in a circuit, the conduction angles in each half cycle are the same. Because this is a switching type circuit rather than an analog circuit, almost negligible power is wasted from the standpoint of input power when solid state switching devices are used with this type of power control. There results a very high efficiency and a very low heat loss. Consequently removal of heat from the switch to keep it operating below maximum rated temperature is a simple problem, usually taken care of by natural convection ventilation.

FIGURE 5 shows one type of power control using two SCR's in an inverse-parallel connection for full-wave A-C control. Each said SCR is triggered by means of a unijunction relaxation oscillator circuit with a single light-sensitive variable resistor in common with both relaxation-oscillator (trigger) circuits. One SCR and its associated pulse generator handle one-half of the cycle; the other SCR and its associated pulse generator handle the other half of the cycle. For one-half of the cycle, conduction is initiated in SCR 16 when its anode 17 is positive with respect to cathode 18 by a positive pulse applied to gate 19.

This positive pulse is generated when the voltage across capacitor 21 reaches a value of eta times the interbase voltage of transistor 22, causing the emitter 23 of the unijunction transistor 22 to conduct, thus discharging capacitor 21 into resistor 26 and gate 19. The interbase voltage of transistor 22 is derived from a voltage divider which is connected between the anode and cathode of SCR 16. This voltage divider is composed of resistor 27, the interbase resistance of unijunction transistor 22, and resistor 26.

Diode 28, light-sensitive resistor (LSVR) 29, and capacitor 21 have a resistance-capacitance (R-C) time constant which governs the charging rate of capacitor 21, the charging rate being inversely proportional to the resistance of LSVR 29 and, hence, the light falling on LSVR 29. The light output of incandescent lamp 31 is, in turn, proportional to the voltage applied to control input terminals 32, rheostat 33 being provided in series therewith for the purpose of adjusting the sensitivity characteristics of the entire switching circuit. Resistor 34 and a voltage breakdown device such as a diode or a neon lamp 35 shunt resistor 27 such that when the voltage across resistor 27 exceeds the breakdown voltage of neon lamp 35, lamp 35 ionizes, increasing the current flow through the interbase resistance of transistor 22 and hence the interbase voltage across transistor 22. In place of a single resistor 34 and single neon lamp 35 one can, of course, use a plurality of appropriate resistors and neon lamps in parallel to give the same effect. In order for emitter 23 to conduct, the voltage across capacitor 21 must be higher when the neon lamp 35 is ionized than when it is not ionized. Since this requirement for higher voltage occurs near the peak of the voltage cycle when lamp 35 ionizes, the middle of the characteristic curve of the switching circuit is expanded, greatly improving the linearity of the switching circuit.

The second half of the cycle is taken care of by the second half of the circuit in the same manner as has been described for the first half of the cycle. The following items illustrated for the second half of the cycle correspond to those previously discussed with respect to the first half cycle: 36 for 16; 37 for 17; 38 for 18; 39 for 19; 41 for 21; 42 for 22; 43 for 23; 44 for 34; 46 for 26; 47 for 27; 48 for 28; and 49 for 35. The discreet voltage breakdown characteristic of neon lamps 35 and 49 (that is, that their ignition point is visually observable), facilitates the adjustment of rheostat 33 so that the breakpoints of an array of similar control circuits can be adjusted in congruence (set to the same sensitivity of input and output) with each other.

When used as an incandescent theatrical lamp dimmer for 2000 watts on 120 volts, typical components which I have used in the circuit illustrated in FIGURE 5 are:

| Drawing Item | |
|---|---|
| 16 and 36—Genereral Electric Co.... | SCR's ZJ 275 B. 25A 200 PIV. |
| 21 and 41—Capacitors | 0.1 microfarad at 100 volts. |
| 22 and 42—Unijunction transistors... | 2N2646. |
| 26 and 46—Resistors | 47 ohms ½ watt. |
| 27 and 47—Resistors | 33,000 ohms 1 watt. |
| 28 and 48—Diodes | IN 456A. |
| 29—Photoconductive cell Clairex Corp. | CL–602. |
| 31—Incandescent lamp, Sylvania | B 4862. |
| 33—Adjustment rheostat | 350 ohms, 2-watt. |
| 34 and 44—Resistors | 68,000 ohms, ½ watt. |
| 35 and 49—Neon lamps | NE-7. |

FIGURE 6 shows another embodiment of my invention using only one SCR, 51, to handle both halves of the cycle. It is triggered by one unijunction transistor relaxation oscillator and is surrounded by rectifiers 52, 53, 54, and 55, which rectify the A-C line to D-C, such that both halves of the cycle are of the same polarity. Conduction is initiated in SCR 51 by a pulse which is positive with respect to the cathode, the pulse being applied to the gate. This positive pulse is generated when the voltage across capacitor 56 reaches a value of eta times the interbase voltage of unijunction transistor 57, causing the emitter of unijunction transistor 57 to conduct, this discharging capacitor 56 into resistor 58 and the gate of SCR 51. The interbase voltage of transistor 57 is derived from a voltage divider which is connected between the anode and cathode of SCR 51.

LSVR 59 and capacitor 56 have a resistance-capacitance time constant which governs the charging rate of capacitor 56, the charging rate being inversely proportional to the resistance of LSVR 59 and hence the light falling on LSVR 59. The light output of the lamp 61 is in turn proportional to the voltage applied across control input terminals 62, rheostat 63 being provided in series therewith to adjust the sensitivity characteristics of the control circuit. Resistor 64 and a voltage breakdown device such as a diode or a neon lamp 65 shunt resistor 66 so that when the voltage across resistor 66 exceeds the breakdown voltage of neon lamp 65, neon lamp 65 ionizes, thereby increasing the current flow through the interbase resistance of transistor 57 and, hence, the interbase voltage of transistor 57. In order for the emitter to conduct, the voltage across capacitor 56 must be higher when the neon lamp 65 is ionized than when it is not ionized.

Since this requirement for higher voltage occurs near the peak voltage of the cycle, the middle of the characteristic curve of the switch is expanded, greatly improving the linearity of the switching circuit (e.g., in lamp dimmer use, the approaching of parabolic correspondence of control setting to useful light output).

Figure 7:
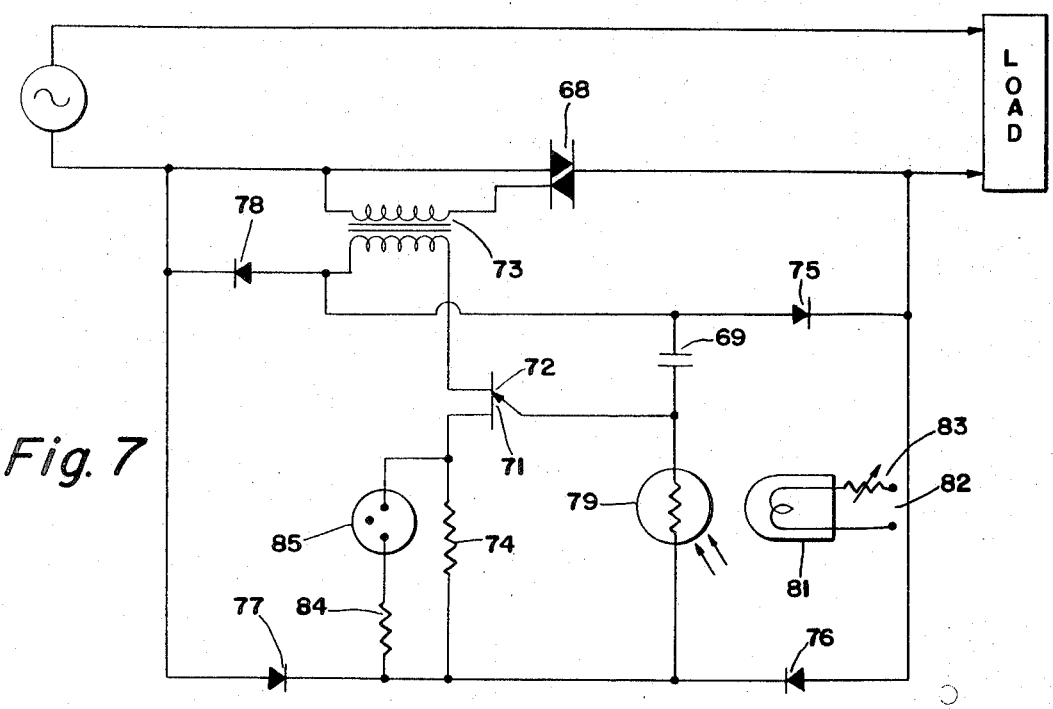

FIGURE 7 shows still another embodiment of my circuit. Solid state switch 68 is bilateral and will conduct during both halves of the cycle; it is conventionally called a "triac." The circuit is composed of a full-wave bridge rectifier and a unijunction transistor relaxation-oscillator trigger coupled to the gate of the triac through a coupling transformer. A pulse is generated when the voltage across capacitor 69 reaches a value of eta times the interbase voltage of the unijunction transistor 71 causing the emitter 72 of unijunction transistor 71 to conduct, thus discharging capacitor 69 into the primary of coupling transformer 73, producing a pulse on the gate of triac 68.

The interbase voltage of unijunction transistor 71 is derived from a voltage divider made up of the interbase resistance of unijunction transistor 71, resitsor 74, and primary of coupling transformer 73, which is connected to the D-C terminals of a full-wave bridge composed of rectifiers 75, 76, 77, and 78. LSVR 79 and capacitor 69 have a resistance-capacitance time constant which governs the charging rate of capacitor 69, the charging rate being inversely proportional to the resistance of the LSVR 79 and hence the light falling on LSVR 79. The light output of incandescent lamp 81 is in turn proportional to the voltage applied to the control input terminal 82, rheostat 83 being provided in series therewith to adjust the sensitivity characteristics.

Resistor 84 and a voltage breakdown device such as a diode or a neon lamp 85 shunt resistor 74 so that when the voltage across resistor 74 exceeds the breakdown voltage of the neon lamp the lamp ionizes, increasing the current flow through the interbase resistance of transistor 71 and hence the interbase voltage of transistor 71. In order for the emitter 72 to conduct, the voltage across capacitor 69 must be higher when the neon lamp 85 is ionized than when it is not ionized. Since this requirement occurs near the peak voltage of the cycle, the middle of the characteristic curve of the switch is expanded, greatly increasing the linearity of the switching circuit. The circuit operates in the second half cycle in the same manner that it operates in the first half cycle.

I claim:
1. An A-C control circuit for controlling power from an A-C voltage source to a load comprising:
   solid state switching means for connection between said A-C voltage source and said load;
   trigger means for initiating conduction in said switching means, said trigger means including
   a unijunction transistor having two base electrodes and an emitter electrode,
   a first resistor connected in series with said base electrodes for connection in electrical circuit across said solid state switching means,
   a second resistor and voltage breakdown means connected in series across said first resistor, and
   a capacitor connected to said transistor emitter electrode, and
   unidirectional conducting means in circuit with said capacitor for permitting charging thereof in one direction only; and
   controllable variable resistance means connected in series with said capacitor for connection in electrical circuit across said solid state switching means for varying the charging rate of said capacitor and thereby determining the time at which said transistor and said solid state switching means become conductive.

2. The control circuit of claim 1, wherein said voltage breakdown means comprises a gas discharge lamp.

3. The control circuit of claim 1, wherein said voltage breakdown means comprises a voltage-breakdown diode.

4. The circuit of claim 1 wherein said solid state switching means includes two controlled rectifiers for electrical connection between said A-C source and said load in opposite polarities, and the circuit includes two trigger means for respectively initiating conduction in said two controlled rectifiers.

5. The control circuit of claim 4, wherein said voltage breakdown means comprises a gas discharge lamp.

6. The control circuit of claim 4 wherein said voltage breakdown means comprises a voltage-breakdown diode.

7. The control circuit of claim 1, wherein said unidirectional conducting means comprises a full wave bridge rectifier circuit for connection between said A-C source and said load, and said solid state switching means comprises a controlled rectifier for connection across said full wave bridge rectifier.

8. The control circuit of claim 7 wherein said voltage breakdown means comprises a gas discharge lamp.

9. The control circuit of claim 7 wherein said voltage breakdown means comprises a voltage-breakdown diode.

10. The control circuit of claim 1, wherein said solid state switching means comprises a bilateral solid state device for connection between said A-C source and said load, and said unidirectional conduction means comprises a full wave bridge rectifier circuit.

11. The control circuit of claim 10 wherein said voltage breakdown means comprises a gas discharge lamp.

12. The control circuit of claim 10 wherein said voltage breakdown means comprises a voltage-breakdown diode.

References Cited

UNITED STATES PATENTS

| | | | |
|---|---|---|---|
| 3,267,289 | 8/1966 | Washington et al. | 307—88.5 |
| 3,256,463 | 9/1966 | Davis | 323—22 |
| 3,192,466 | 6/1965 | Sylvan et al. | 323—22 |
| 3,188,490 | 6/1965 | Hoff et al. | 307—88.5 |
| 3,146,392 | 8/1964 | Sylvan | 323—22 |
| 2,609,527 | 9/1952 | Raburn | 323—4 |
| 3,170,085 | 2/1965 | Genuit | 315—227 |

JOHN F. COUCH, *Primary Examiner.*

W. WACHTELL, H. HUBERFELD,
*Assistant Examiners.*